United States Patent
Akutsu

(10) Patent No.: US 12,030,145 B2
(45) Date of Patent: Jul. 9, 2024

(54) MACHINE TOOL AND SYSTEM

(71) Applicant: FANUC CORPORATION, Yamanashi (JP)

(72) Inventor: Yuu Akutsu, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 1003 days.

(21) Appl. No.: 16/883,027

(22) Filed: May 26, 2020

(65) Prior Publication Data
US 2020/0384591 A1    Dec. 10, 2020

(30) Foreign Application Priority Data

Jun. 6, 2019    (JP) .................... 2019-105886

(51) Int. Cl.
*B23Q 11/12* (2006.01)
*B23B 25/00* (2006.01)
(Continued)

(52) U.S. Cl.
CPC ............ *B23Q 11/127* (2013.01); *B23B 25/00* (2013.01); *B23Q 11/0007* (2013.01);
(Continued)

(58) Field of Classification Search
CPC ..... B23Q 11/127; B23Q 11/126; B23Q 11/10; B23Q 11/14; B23B 25/06; G06N 20/00; F25B 21/02; F25B 2321/02; F25B 2321/021; F25B 2321/0212; G05B 2219/37434; G05B 2219/37435; G05B 2219/37428; G05B 2219/37429; H02P 23/04
See application file for complete search history.

(56) References Cited

U.S. PATENT DOCUMENTS

| | | |
|---|---|---|
| 4,561,218 A | 12/1985 | Dzewaltowski et al. |
| 6,305,183 B1 | 10/2001 | Mukai et al. |

(Continued)

FOREIGN PATENT DOCUMENTS

| | | |
|---|---|---|
| CN | 105415088 A | 3/2016 |
| CN | 107160237 A | 9/2017 |

(Continued)

OTHER PUBLICATIONS

Oxford English Dictionary—Transistor (Year: 2023).*
(Continued)

*Primary Examiner* — Jenna M Maroney
(74) *Attorney, Agent, or Firm* — KARCESKI IP LAW, PLLC

(57) ABSTRACT

A machine tool including a first cooling unit, such as a fan, that cools at least one of a drive part that drives a component of the machine tool and an amplifier of the drive part, a second cooling unit, such as a Peltier element, that cools the at least one of the drive part and the amplifier, and a cooling control unit that controls the first cooling unit and the second cooling unit, wherein vibration caused by the second cooling unit is less than vibration caused by the first cooling unit, and the cooling control unit switches cooling of the at least one of the drive part and the amplifier, from cooling by the first cooling unit to cooling by the second cooling unit.

6 Claims, 12 Drawing Sheets

(51) Int. Cl.
*B23Q 11/00* (2006.01)
*B23Q 11/10* (2006.01)
*B23Q 11/14* (2006.01)

(52) U.S. Cl.
CPC .............. *B23Q 11/10* (2013.01); *B23Q 11/14* (2013.01); *G05B 2219/49052* (2013.01)

(56) References Cited

U.S. PATENT DOCUMENTS

| | | | | |
|---|---|---|---|---|
| 8,672,593 | B2 * | 3/2014 | Sato | B23Q 11/128 409/238 |
| 10,766,112 | B2 * | 9/2020 | Nakamura | B23Q 5/10 |
| 11,148,241 | B2 * | 10/2021 | Kawada | B23Q 1/70 |
| 2004/0013335 | A1 * | 1/2004 | Inoue | H02K 5/1732 409/231 |
| 2014/0242887 | A1 | 8/2014 | Schuele et al. | |
| 2017/0060104 | A1 * | 3/2017 | Genma | G05B 13/0265 |
| 2018/0043491 | A1 | 2/2018 | Nakamura | |
| 2020/0170142 | A1 * | 5/2020 | Miyazaki | G05B 19/4155 |

FOREIGN PATENT DOCUMENTS

| | | | | |
|---|---|---|---|---|
| CN | 108000231 | A | 5/2018 | |
| CN | 207642929 | U | 7/2018 | |
| CN | 108422267 | A | 8/2018 | |
| CN | 207976809 | U | 10/2018 | |
| CN | 109202524 | A | 1/2019 | |
| DE | 3729541 | A1 | 3/1989 | |
| EP | 0191232 | A2 | 8/1986 | |
| EP | 0985490 | A2 | 3/2000 | |
| JP | 861182771 | A | 8/1986 | |
| JP | H1190766 | A | 4/1999 | |
| JP | 2000141219 | A | 5/2000 | |
| JP | 2000266039 | A | 9/2000 | |
| JP | 2003170327 | A | 6/2003 | |
| JP | 2004122267 | A | 4/2004 | |
| JP | 2006142385 | A | 6/2006 | |
| JP | 2008237930 | A | 10/2008 | |
| JP | 2009214188 | A | 9/2009 | |
| JP | 2016165770 | A | 9/2016 | |
| JP | 2019188578 | A | 10/2019 | |
| RU | 181447 | U1 * | 7/2018 | ............. B23B 27/10 |
| RU | 182798 | U1 * | 9/2018 | ............. B23B 27/10 |

OTHER PUBLICATIONS

Japanese Office Action dated May 23, 2023, for Japanese Patent Application No. 2019-105886.
Japanese Office Action dated Nov. 22, 2022, for Japanese Patent Application No. 2019-105886.
Chinese Office Action dated Dec. 20, 2023, for Chinese Patent Application No. 202010476915.5.

* cited by examiner

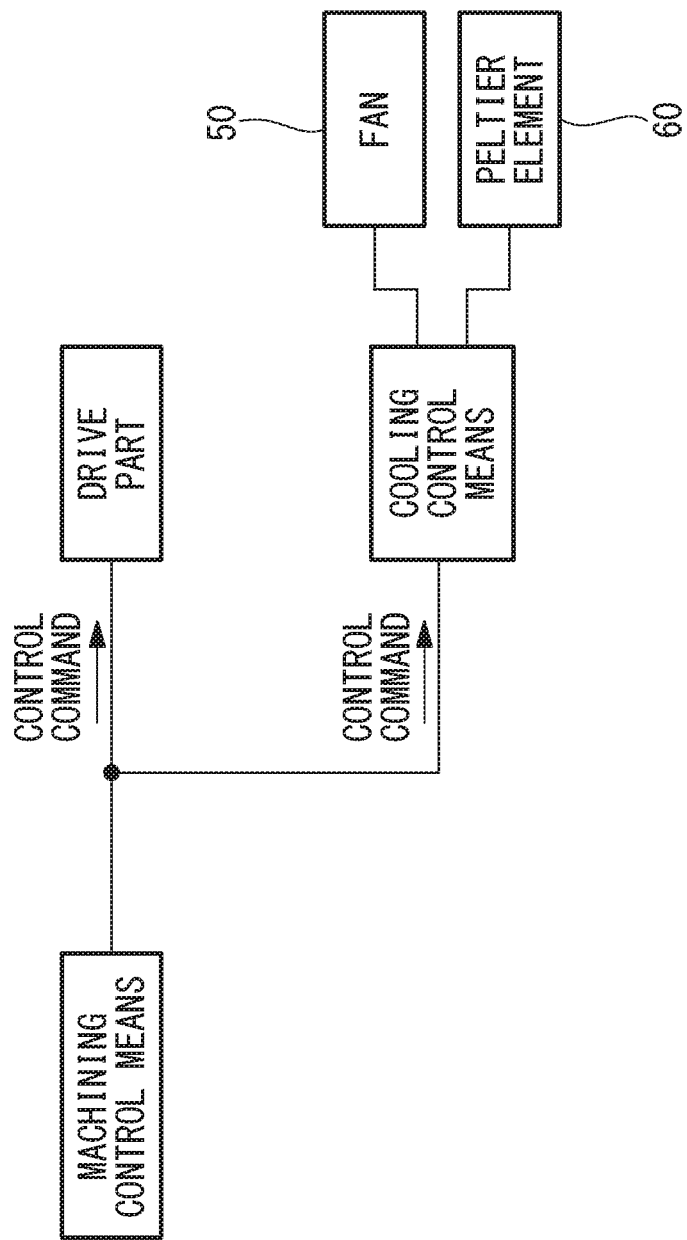

FIG. 7

| TOOL TYPE | SPEED OF SPINDLE | MACHINING LOAD SCORE | COOLING MEANS |
|---|---|---|---|
| A | LOW | LOW | SECOND COOLING MEANS |
| A | LOW | HIGH | FIRST COOLING MEANS |
| A | HIGH | LOW | FIRST COOLING MEANS |
| A | HIGH | HIGH | FIRST COOLING MEANS |
| B | LOW | LOW | SECOND COOLING MEANS |
| B | LOW | HIGH | SECOND COOLING MEANS |
| B | HIGH | LOW | SECOND COOLING MEANS |
| B | HIGH | HIGH | FIRST COOLING MEANS |
| ⋮ | ⋮ | ⋮ | ⋮ |

FIG. 8

| TOOL TYPE | COOLING MEANS |
|---|---|
| A | FIRST COOLING MEANS |
| B | SECOND COOLING MEANS |
| ⋮ | ⋮ |

US 12,030,145 B2

MACHINE TOOL AND SYSTEM

CROSS-REFERENCE TO RELATED APPLICATIONS

This application is based on and claims priority to Japanese Patent Application No. 2019-105886 filed on Jun. 6, 2019, the entire content of which is incorporated herein by reference.

FIELD OF THE INVENTION

The present invention relates to a machine tool and a system.

BACKGROUND OF THE INVENTION

In the related art, there is a known machine tool that performs cooling of a spindle by circulating a coolant inside the spindle. For example, see Japanese Unexamined Patent Application, Publication No. 2016-165770. This machine tool includes a temperature sensor for detecting the temperature of the spindle and controls the circulation state of the coolant on the basis of a detected value from the temperature sensor.

SUMMARY OF THE INVENTION

According to a first aspect, the present disclosure provides a machine tool including: a first cooling unit that cools at least one of a drive part that drives a component of the machine tool and an amplifier of the drive part; a second cooling unit that cools the at least one of the drive part and the amplifier; and a cooling control unit that controls the first cooling unit and the second cooling unit, wherein vibration caused by the second cooling unit is less than vibration caused by the first cooling unit, and the cooling control unit switches cooling of the at least one of the drive part and the amplifier, from cooling by the first cooling unit to cooling by the second cooling unit.

According to a second aspect, the present disclosure provides a system including: said machine tool; and a host control system capable of communicating with a controller of the machine tool, wherein the host control system accumulates learning results received from the controller of the machine tool.

BRIEF DESCRIPTION OF THE DRAWINGS

FIG. 6 is a functional block diagram of the control device in the machine tool of this embodiment.
FIG. 7 is an example table showing cooling method information in this embodiment.
FIG. 8 is another example table showing cooling method information in this embodiment.

DESCRIPTION OF EMBODIMENT(S) OF THE INVENTION

A machine tool according to an embodiment will be described below with reference to the drawings.

Figure 1:
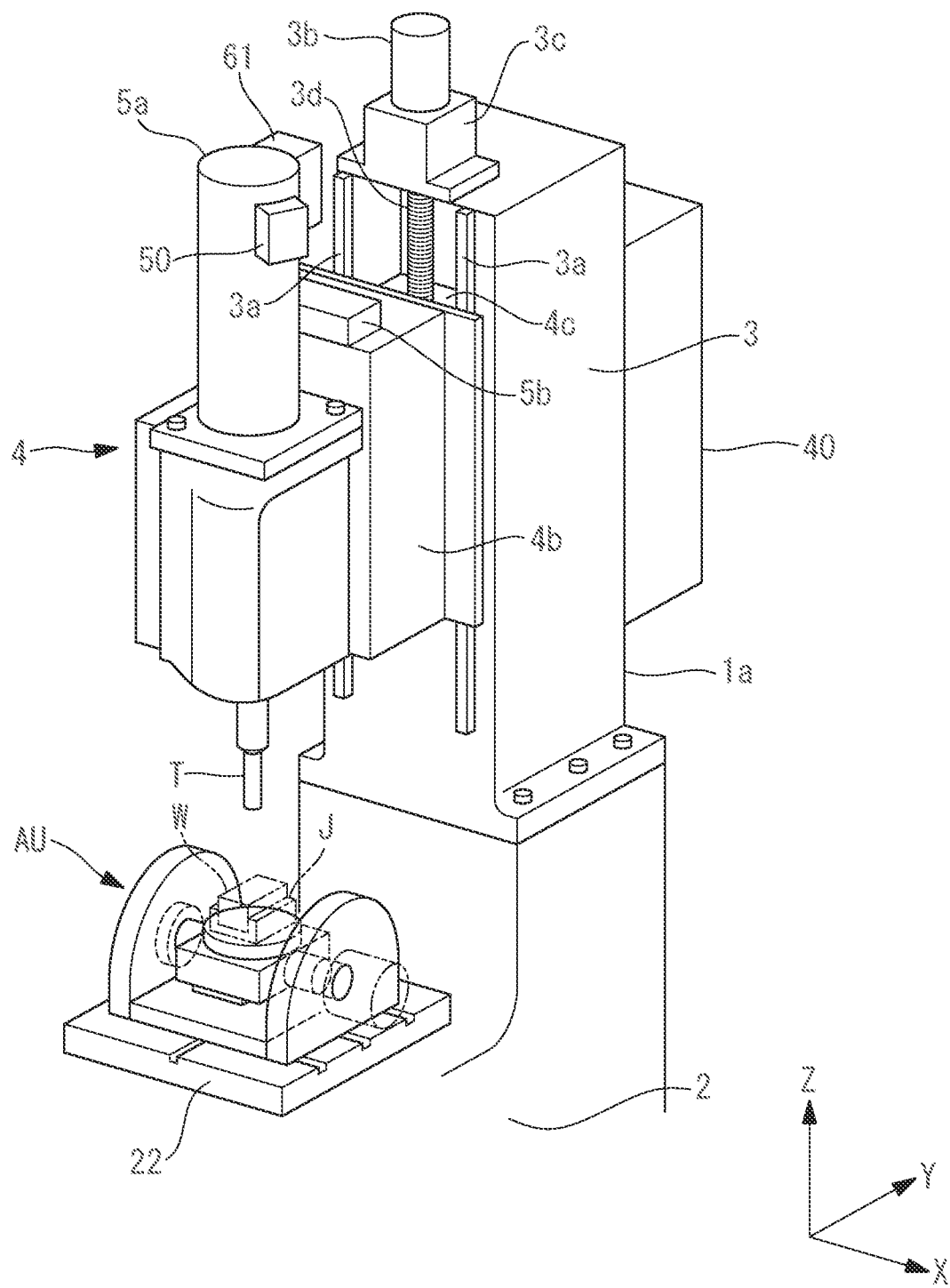
FIG. 1 is a schematic perspective view of a machine tool according to one embodiment of the present invention.

As shown in FIG. 1, the machine tool of this embodiment includes: a machine tool body 1a that has a base 2 and a column part 3 that extends upward from the base 2; a spindle unit 4 that is supported by the column part 3 so as to be movable in the vertical direction; and an X-Y table 22 on which a workpiece W is supported. The machine tool is disposed inside a machining chamber (not shown).

Figure 3:
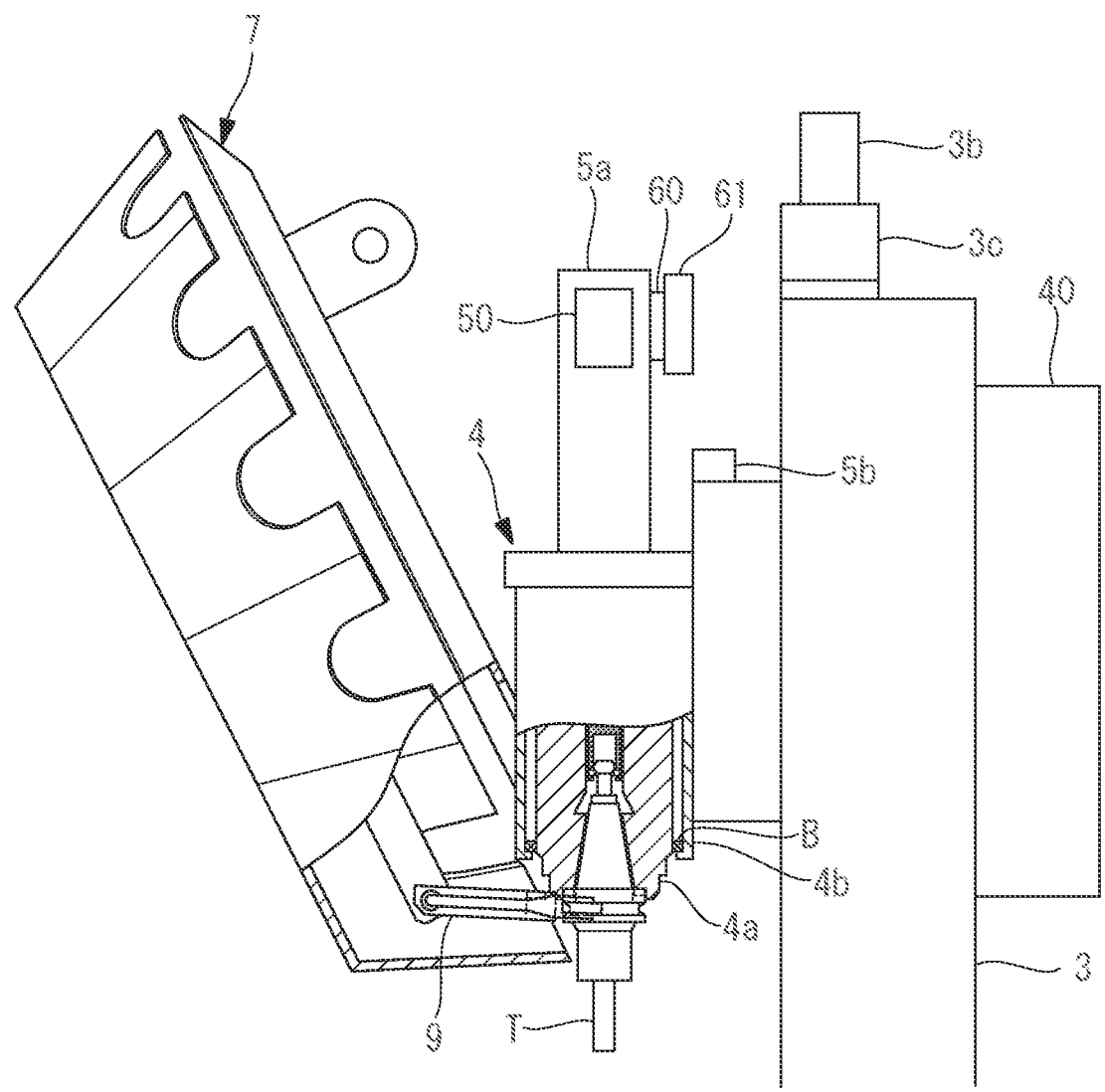
FIG. 3 is a schematic side view of the machine tool of this embodiment.

As shown in FIG. 3, the machine tool of this embodiment is provided with a tool magazine 7 for automatically changing a tool T that is attached to a spindle 4a of the spindle unit 4. A plurality of tools T accommodated in the tool magazine 7 are selectively held by the spindle 4a.

A plurality of tool holders 9 are provided in the tool magazine 7 and are arranged in the circumferential direction of the tool magazine 7.

The spindle unit 4 includes a spindle head 4b that supports the spindle 4a via a plurality of bearings B.

A plurality of guide rails 3a that extend in the vertical direction (Z-axis direction) are provided on the column part 3, and the spindle head 4b is supported by the guide rails 3a so as to be movable in the vertical direction. Furthermore, a Z-axis motor 3b, such as a servomotor, is fixed to an upper end section of the column part 3, and an output from an output shaft of the Z-axis motor 3b is transmitted to a ball screw 3d via a reducer 3c. The ball screw 3d is disposed along the guide rails 3a and is mated with a ball screw nut 4c that is fixed to a rear section of the spindle head 4b. In this way, the linear motion mechanism makes the spindle head 4b movable in the vertical direction.

Furthermore, the spindle 4a and the tool T are rotated about the central axis of the spindle 4a by a spindle motor 5a connected to an upper end section of the spindle 4a.

In the machine tool, the workpiece W is processed with the rotating tool T while the workpiece W and the tool T are being relatively moved through movement of the X-Y table 22 in the horizontal direction and movement of the spindle 4a in the vertical direction.

The base 2 is installed, at a place where the machine tool is used, by using, for example, leveling bolts, anchor bolts, or the like. The X-Y table 22 is placed on the base 2, and the workpiece W is fixed on an upper surface of the X-Y table 22 via a jig J and an additional axis unit AU. The X-Y table 22 and the workpiece W are moved in the horizontal directions with respect to the spindle 4a, by motors 13 and 23 that are provided on the base 2.

Figure 2:
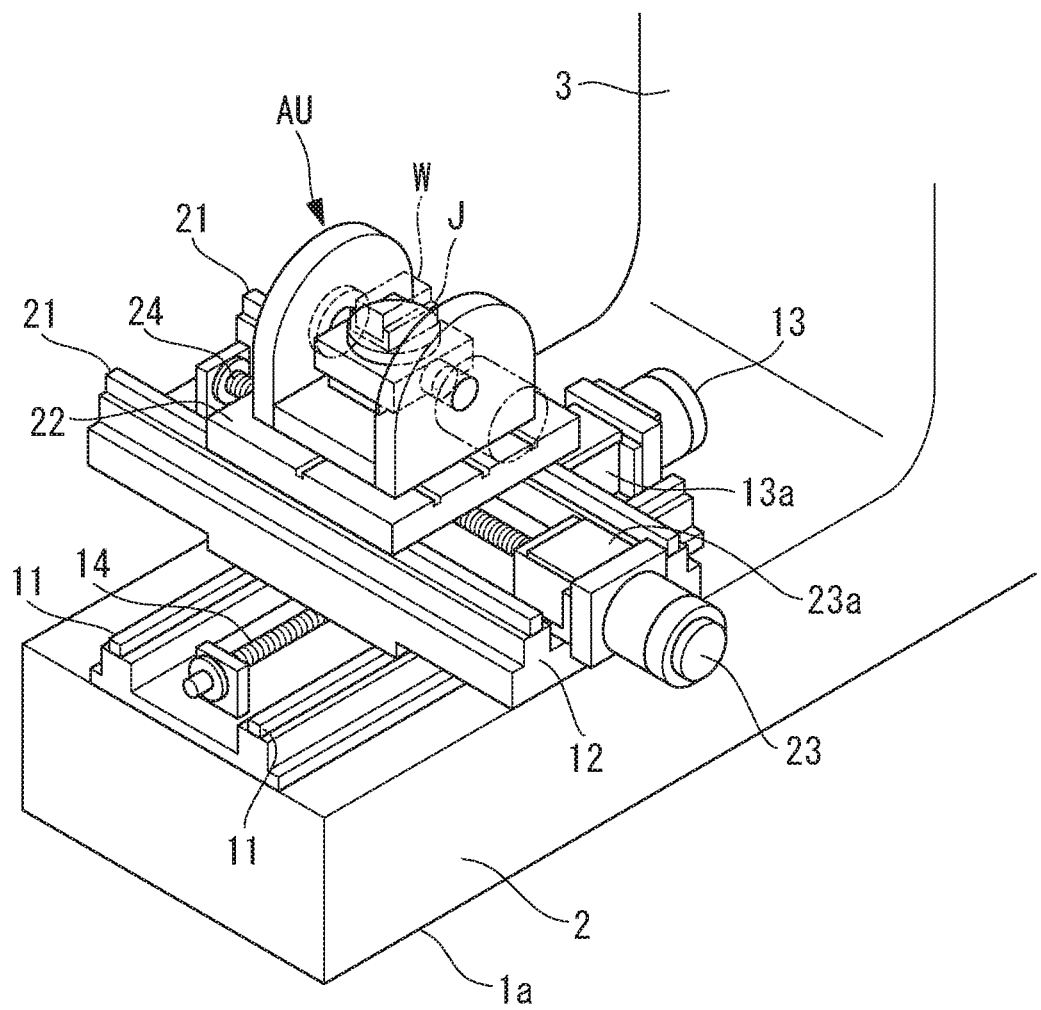
FIG. 2 is a schematic perspective view of an X-Y table in the machine tool of this embodiment.

As shown in FIG. 2, a plurality of guide rails 11 that extend in the Y-axis direction, which is a horizontal direction, are provided on an upper-surface section of the base 2, and a Y-direction movable part 12 is supported on the guide rails 11 so as to be movable in the Y-axis direction. Furthermore, the Y-axis motor 13 is fixed to the upper-surface section of the base 2, and an output from the Y-axis motor 13 is transmitted to a ball screw 14 via a reducer. The ball screw 14 is disposed along the guide rails 11 and is mated with a ball screw nut that is fixed to the Y-direction movable part 12. As described above, the linear motion mechanism in which the Y-direction movable part 12 is moved in the Y-axis direction through rotation of an output shaft of the Y-axis motor 13 is configured.

Furthermore, as shown in FIG. 2, a plurality of guide rails 21 that extend in the X-axis direction, which is a horizontal direction, are provided on an upper-surface section of the Y-direction movable part 12, and the X-Y table 22 is supported on the guide rails 21 so as to be movable in the X-axis direction. Furthermore, an X-axis motor 23 is fixed to the upper-surface section of the Y-direction movable part 12, and an output from an output shaft of the X-axis motor 23 is transmitted to a ball screw 24 via a reducer. The ball screw 24 is disposed along the guide rails 21 and is mated with a ball screw nut that is fixed to the X-Y table 22. As described above, the linear motion mechanism in which the X-Y table 22 is moved in the X-axis direction through rotation of the output shaft of the X-axis motor 23 is configured.

As shown in FIGS. 1 and 3, a fan 50 for cooling the spindle motor 5a is attached to the spindle motor 5a. The fan 50 may be incorporated in the spindle motor 5a. Furthermore, as shown in FIG. 3, one surface of a Peltier element 60 is in contact with an outer circumference surface of the spindle motor 5a, and the other surface of the Peltier element 60 is in contact with a metal block 61. Radiation fins are appropriately provided on an outer surface of the block 61. The fan 50 is connected to a control device 40, to be described later, and is controlled by the control device 40. Furthermore, the Peltier element 60 is also connected to the control device 40, and a voltage is applied thereto by the control device 40.

Figure 4:
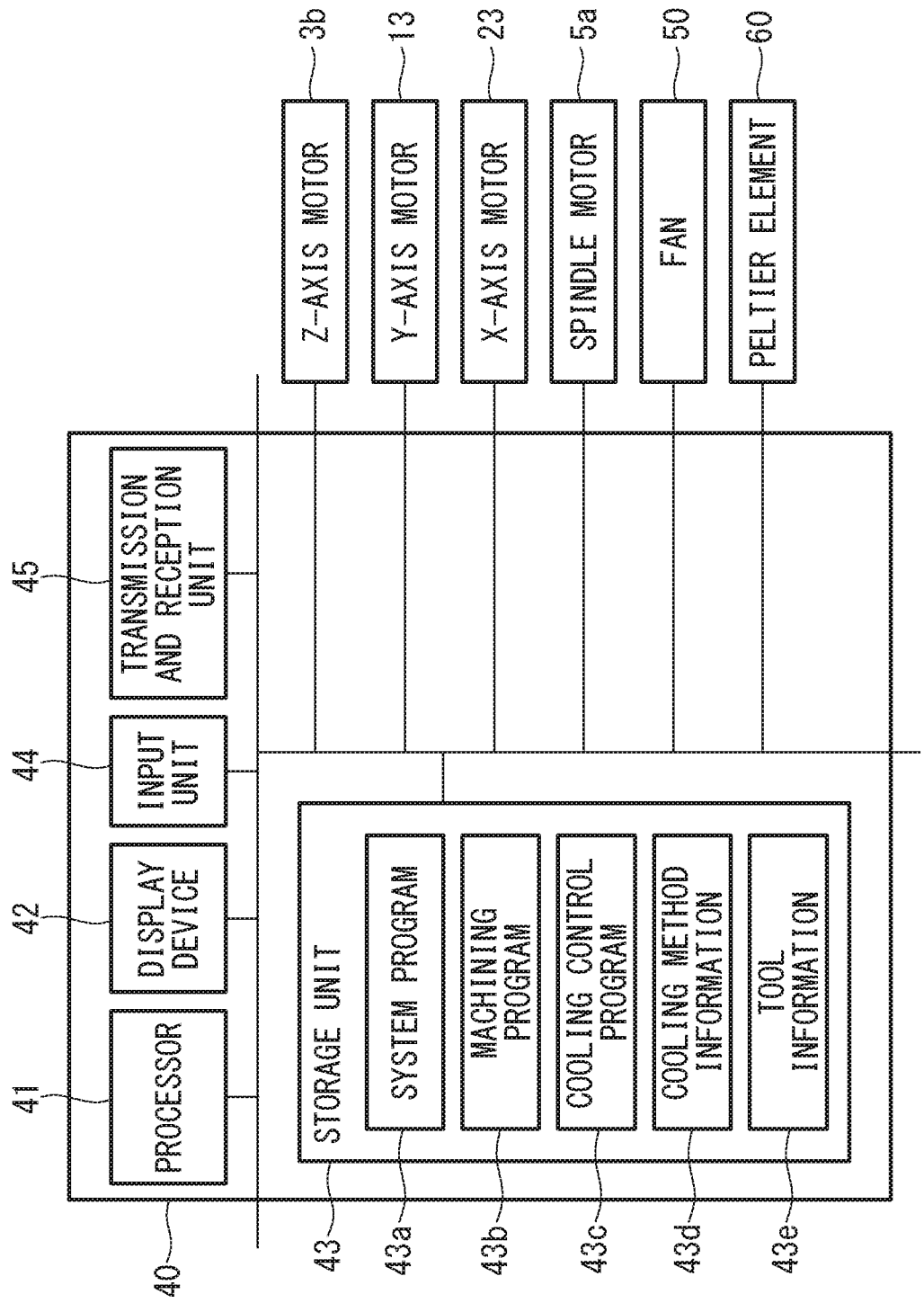
FIG. 4 is a block diagram of a control device in the machine tool of this embodiment.

The control device 40, which controls the machine tool, is provided on the machine tool. As shown in FIG. 4, the control device 40 has: a processor 41, such as a CPU; a display device 42; a storage unit 43 that has a non-volatile storage, a ROM and/or a RAM; an input unit 44, such as an operation panel; and a transmission and reception unit 45 that has an antenna and/or a connector. The storage unit 43 stores a system program 43a, and the system program 43a is responsible for basic functions of the control device 40.

Furthermore, the storage unit 43 stores a machining program 43b, a cooling control program 43c, and cooling method information 43d. The control device 40 reads the machining program 43b and sends control commands to the respective motors 3b, 5a, 13, 23, and the tool magazine 7 by means of the processor 41, thereby performing machining on the workpiece W using the tool T and changing the tool T on the spindle 4a by using the tool magazine 7. In short, the processor 41, the RAM, and the machining program 43b function as a machining control means.

Note that the cooling control program 43c may be a section of the machining program 43b. Furthermore, the storage unit 43 stores tool information 43e, which is information of the types of tools T respectively attached to the plurality of tool holders 9 of the tool magazine 7.

Figure 5:
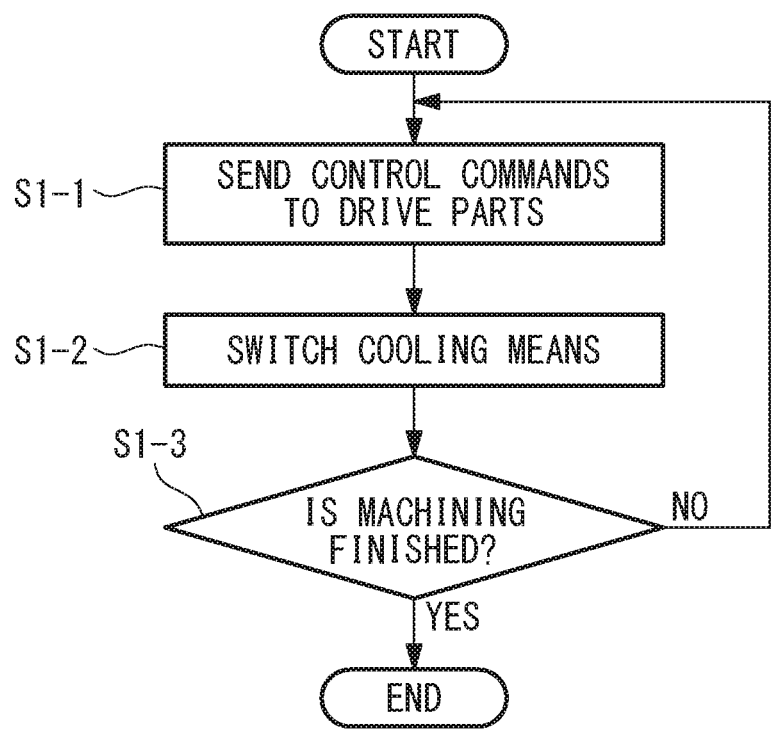
FIG. 5 is a flowchart showing example processing performed by the control device in the machine tool of this embodiment.

The control device 40 reads the cooling control program 43c by means of the processor 41 and switches between cooling by the fan 50 and cooling by the Peltier element 60. In short, the processor 41, the RAM, and the cooling control program 43c function as a cooling control means. Example processing performed by the control device 40 at this time will be described below with reference to a flowchart shown in FIG. 5. Furthermore, an example functional block diagram of the machine tool is shown in FIG. 6.

The control device 40 sends control commands to drive parts, such as the respective motors 3b, 5a, 13, and 23 and a motor of the tool magazine 7, on the basis of the machining program 43b (Step S1-1). For example, the control device 40 sends, to the tool magazine 7, a control command for mounting a tool T on the spindle 4a and also sends, to the Z-axis motor 3b, a control command for attaching a tool T in the tool magazine 7 to the spindle 4a. Furthermore, after the tool change, the control device 40 sends, to the spindle motor 5a, a control command to start it rotation for machining the workpiece W. Furthermore, the control device 40 also sends a control command regarding the speed of the spindle motor 5a. Accordingly, machining of the workpiece W using the tool T is started.

Then, according to the cooling control program 43c, the control device 40 switches between cooling performed by using the fan 50 and cooling performed by using the Peltier element 60, on the basis of the aforementioned control commands and the cooling method information 43d, which is stored in the storage unit 43 (Step S1-2). In the functional block diagram of FIG. 6, the cooling control means receives the aforementioned control commands and controls the fan 50 and the Peltier element 60 in accordance with the received control commands. The control device 40 repeats Steps S1-1 to S1-2 until the machining of the workpiece W using the machine tool is finished (Step S1-3).

As shown in FIG. 7, for example, the cooling method information 43d is information in which a cooling means is associated with information of the type of the tool T that is included in a control command, information of the speed of the spindle 4a, information of the moving speed of the tool T during machining, information of a feed amount (cutting amount) of the tool T. In the example shown in FIG. 7, a machining load score calculated from the information of the moving speed of the tool T during machining and the information of the feed amount of the tool T is used. The control device 40 calculates a machining load score from information of the moving speed of the tool T during machining, the tool T included in the control command, and information of the feed amount of the tool T. Note that the cooling method information 43d may also contain information of the rotation time of the spindle 4a, or information of the material of the workpiece W, and the cooling method information 43d may be information which indicates a cooling means in response to the above pieces of information.

Note that the control device 40 may also pre-read, in the machining program 43b, a section of a predetermined time to be performed, on the basis of the cooling control program 43c. In this case, the control device 40 switches between cooling performed by using the fan 50 and cooling performed by using the Peltier element 60, on the basis of the information of the speed of the spindle 4a and/or the machining load score, based on a control command from the pre-read section.

In this embodiment, a first cooling means shown in FIG. 7 is the fan 50, and a second cooling means shown therein is the Peltier element 60. Cooling performed by using the first cooling means may also be cooling performed by using the fan 50 and the Peltier element 60. Specifically, a plurality of cooling means may be used at the same time depending on the situation.

In Step S1-2, in a case in which information of the type of the tool T that is included in the control command is A, the speed of the spindle 4a is high, and the machining load score is low, the control device 40 performs cooling of the spindle motor 5a by using the fan 50.

For example, the tool T of type A is used for rough cutting, and the tool T of type B is used for finishing. In some cases, at the time of finishing, it is required that vibrations of the machine tool be eliminated as much as possible. The cooling method information 43d shown in FIG. 7 responds to such a demand. Specifically, in a case in which information of the type of the tool T that is included in the next control command is B, the control device 40 switches from the cooling performed by using the fan 50 to the cooling performed by using the Peltier element 60, except for a case in which the speed of the spindle 4a is high, and the machining load score is also high. Vibrations caused by the Peltier element 60 are less than vibrations caused by the fan 50. Thus, cooling performed by using the Peltier element 60 contributes to an improvement of the machining accuracy at the time of finishing.

Note that, instead of the cooling method information 43d shown in FIG. 7, cooling method information 43d shown in FIG. 8 may also be used. If the cooling method information 43d shown in FIG. 8 is used, in Step S1-2, the control device 40 performs cooling by using the fan 50 when the type of the tool T included in the control command is A and performs cooling by using the Peltier element 60 when the type of the tool T included in the control command is B.

Note that the fan 50 and the Peltier element 60 may also be provided on the other motors 3b, 13, and 23. In this case, the control device 40 can also switch from cooling performed by using the fan 50 to cooling performed by using the Peltier element 60, on the basis of information of the speeds of the motors 3b, 13, and 23, included in control commands. Furthermore, the fan 50 and the Peltier element 60 may be ones which cool another drive part in the machine tool.

Furthermore, the fan 50 and the Peltier element 60 may also be provided for cooling an amplifier 5b of the spindle motor 5a. In this case, the control device 40 can also switch from cooling performed by using the fan 50 to cooling performed by using the Peltier element 60, by using the cooling method information shown in FIG. 7 or FIG. 8.

In this embodiment, the first cooling means for cooling at least one of the drive part, such as the spindle motor 5a, which drives the spindle 4a serving as a component of the machine tool, and an amplifier 5b of this drive part, and the second cooling means for cooling the at least one of the drive part and the amplifier 5b are included. Vibrations caused by the second cooling means are less than vibrations caused by the first cooling means. Here, the magnitude of the vibrations is, for example, the magnitude of the vibration amplitude or the magnitude of an acceleration value. Furthermore, the control device 40 switches the cooling of the at least one of the drive part and the amplifier 5b, from cooling performed by using the first cooling means to cooling performed by using the second cooling means.

For example, if machining using the tool T is rough machining, cooling by the first cooling means, such as the fan 50, which causes large vibrations, is performed. If machining using the tool T is high-quality machining, such as high-precision machining or mirror-surface machining, cooling by the second cooling means, such as the Peltier element 60, which causes small vibrations, is performed. This configuration is advantageous for achieving both an improvement of the machining accuracy and proper cooling of the spindle 4a.

Thus, for example, it is also possible that cooling performed by using the first cooling means is cooling performed by using the fan 50 and the Peltier element 60, and cooling performed by using the second cooling means is cooling performed by using the Peltier element 60. In this case, vibrations caused by the second cooling means are less than those caused by the first cooling means. It is also possible that cooling performed by using the first cooling means is cooling performed by using the fan 50 and another cooling means to be described later, and cooling performed by using the second cooling means is cooling performed by the other cooling means. Cooling performed by using the other cooling means can also be cooling performed by using a plurality of cooling devices or cooling equipment.

Furthermore, in this embodiment, the control device 40 controls the drive part, such as the spindle motor 5a, on the basis of the machining program 43b. Furthermore, the control device 40 switches from cooling performed by using the first cooling means to cooling performed by using the second cooling means, in response to a control command output to the drive part on the basis of the machining program 43b.

In this way, cooling is switched from cooling performed by using the first cooling means to cooling performed by using the second cooling means, on the basis of a control command from the machining program 43b. This configuration leads to a reduction in the trouble of performing settings for switching the cooling means.

Furthermore, in this embodiment, the storage unit 43 stores the cooling method information 43d, which corresponds to each of the multiple types of the tools T, and the cooling method information 43d indicates, for each of the multiple types of the tools T used for machining, whether to use the first cooling means or the second cooling means. Then, the control device 40 switches from cooling performed by using the first cooling means to cooling performed by using the second cooling means, by using the information of the tool T that is in use, among the multiple types of the tools T, and the cooling method information 43d.

For example, in a case in which the tool T of type A is used for rough machining, and the tool T of type B is used for high-precision machining and/or mirror-surface machining, the cooling method information 43d indicates, for the tool T of type B, whether to use the first cooling means or the second cooling means. The cooling method information 43d may also indicate, for the tool T of type B, whether to use the first cooling means or the second cooling means, in each of the other conditions, such as the speed. Thus, it is possible to achieve both an improvement of the machining accuracy and proper cooling of the spindle 4a, without a user having to perform detailed settings on site.

Furthermore, in this embodiment, the control device 40 sends a control command to the spindle motor 5a, thereby controlling the speed of the spindle 4a. Furthermore, the control device 40 switches from cooling performed by using the first cooling means to cooling performed by using the second cooling means, in accordance with the speed of the spindle 4a. Thus, it is possible to achieve both an improvement of the machining accuracy and proper cooling of the spindle 4a, without the user having to perform detailed settings.

Note that there is a case in which the machining program 43b includes information of the machining quality of the workpiece W. Furthermore, there is a case in which the control device 40 determines that high-quality machining, such as high-precision machining or mirror-surface machining, is performed on the basis of a control command from the machining program 43*b*. In this case, the determination result becomes information of the machining quality.

The control device 40 may also switch from cooling performed by using the first cooling means to cooling performed by using the second cooling means in accordance with information of the machining quality. In this case, it is also possible to achieve both an improvement of the machining accuracy and proper cooling of the spindle 4*a*, without the user having to perform detailed settings.

Figure 9:
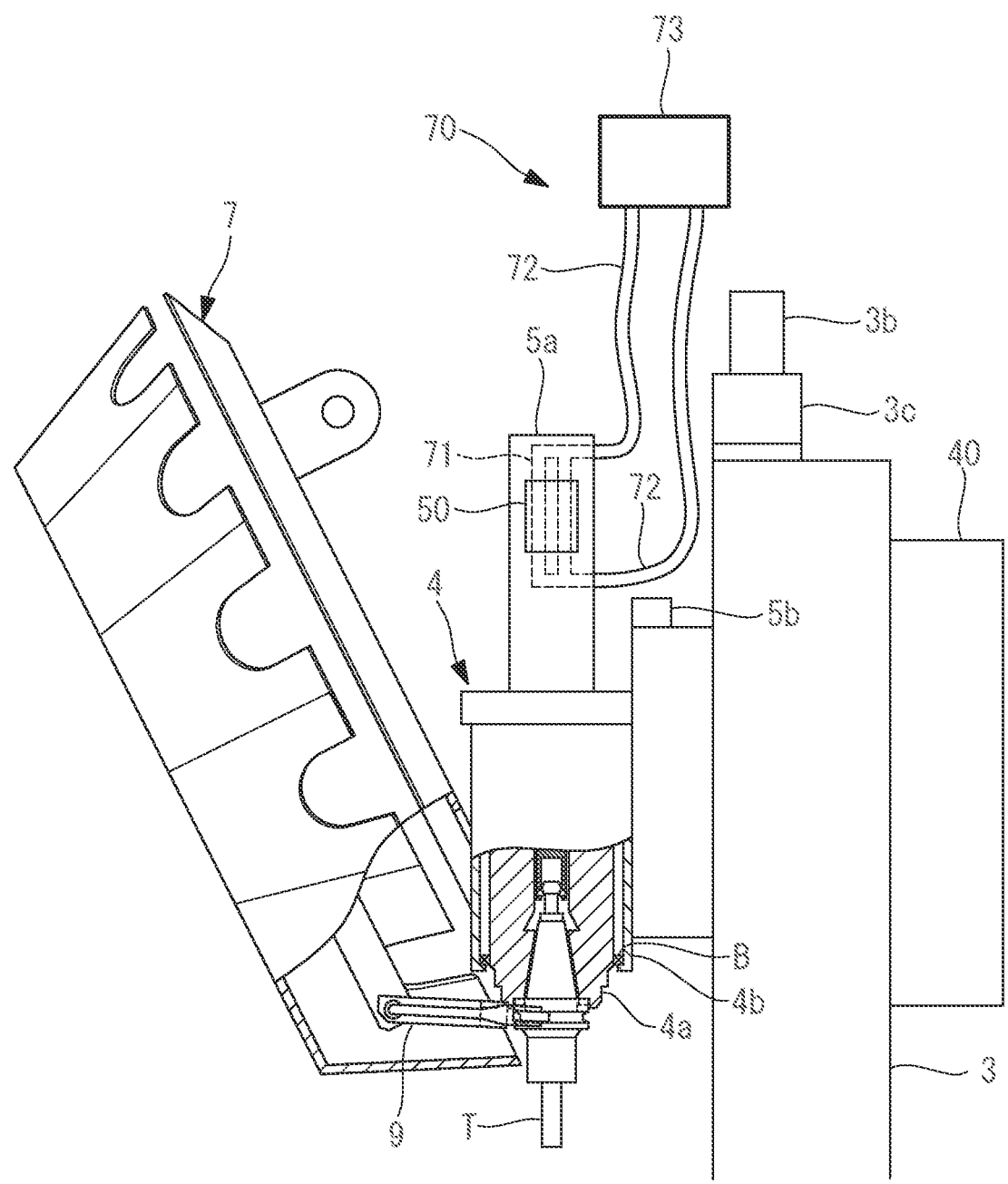
FIG. 9 is a schematic side view of a machine tool according to a modification of this embodiment.

Note that, in the above-described embodiment, although the second cooling means is the Peltier element 60, as shown in FIG. 9, the second cooling means may be a liquid cooling device 70. For example, the liquid cooling device 70 has: a cooling passage 71 that passes through the inside of the spindle motor 5*a*; tubes 72 that are connected to the cooling passage 71; and a liquid supply device 73 that supplies a coolant to the cooling passage 71 through the tubes 72. In this case, for example, when the tool T of type B is attached to the spindle 4*a*, the cooling means is switched from the fan 50 to the liquid cooling device 70. In this case, vibrations caused by the liquid cooling device 70 are less than vibrations caused by the fan 50.

Furthermore, in FIG. 9, the liquid cooling device 70 may constitute a refrigeration cycle. In this case, the liquid supply device 73 is a compressor that compresses a refrigerant, and the cooling passage 71 functions as a heat sink that absorbs ambient heat through vaporization of the refrigerant. In this case, a condenser and a radiator are provided between the compressor and the cooling passage 71. Furthermore, expansion valves and/or other radiators are provided on the tubes 72, as needed. In this case, vibrations caused by the liquid cooling device 70 are less than vibrations caused by the fan 50.

The liquid supplied by the liquid supply device 73 to the cooling passage 71 may also be liquid nitrogen. In this case, because the amount of liquid to be supplied to the cooling passage 71 can be reduced, vibrations caused by the liquid cooling device 70 are reduced. Furthermore, the liquid supplied by the liquid cooling device 70 to the cooling passage 71 may also be a liquid that causes a chemical reaction inside the cooling passage 71, thereby performing heat absorption. The liquid supply device 73 may supply two types of liquids to the cooling passage 71, and the two types of liquids may cause a chemical reaction inside the cooling passage 71.

Furthermore, instead of the liquid supply device 73, a dry-ice supply device that supplies powdered dry ice may also be attached to the tubes 72. In this case, the powdered dry ice is supplied to the cooling passage 71.

Furthermore, the second cooling means may also be a heat sink. As a heat sink, for example, the metal block 61, shown in FIGS. 1 and 3, may be in contact with the spindle motor 5*a* without the intervening Peltier element 60. A tube may be provided inside the block 61, and a refrigerant may be enclosed in the tube. In this case, the refrigerant evaporates, in the tube, at a position close to the spindle motor 5*a*, and the refrigerant condenses, in the tube, at a position away from the spindle motor 5*a*. Vibrations caused by the heat sink are less than vibrations caused by the fan 50.

When the block 61 serving as a heat sink or the Peltier element 60 is used as the second cooling means, it is also possible to use, as the first cooling means, the liquid cooling device 70, instead of the fan 50. In this case, vibrations caused by the heat sink or the Peltier element 60 are less than vibrations caused by the liquid cooling device 70.

Note that the machine tool may include a computer, such as a microcomputer, a personal computer, or a PLC (Programmable Logic Controller), and the first cooling means or the second cooling means may be controlled by the computer.

Furthermore, the first cooling means and the second cooling means of a plurality of machine tools may be controlled by a single control device 40 or the aforementioned computer.

Figure 13:
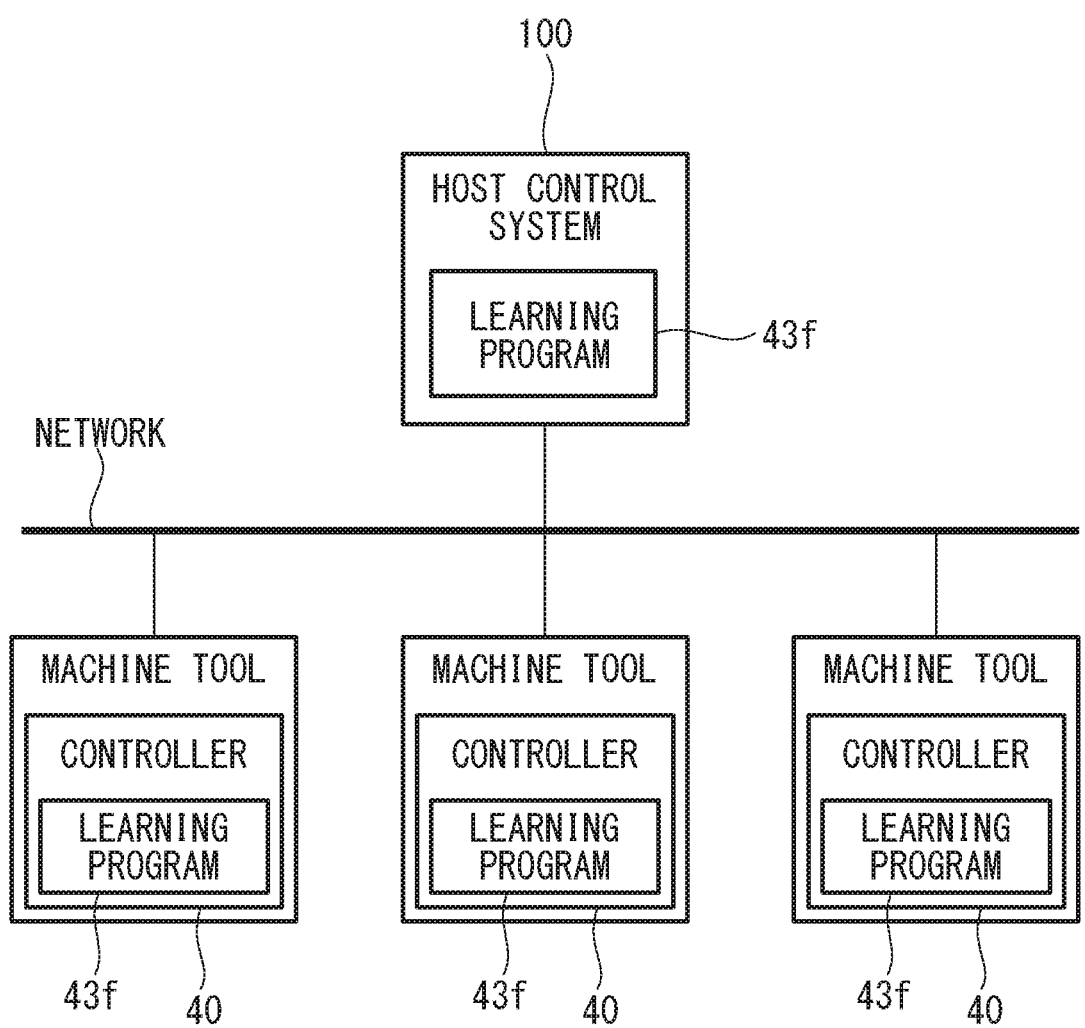
FIG. 13 is a block diagram of a system that includes the machine tool of this embodiment.

In the above-described embodiment, the control device 40 may have a learning function. For example, as shown in FIG. 13, the control device 40 may have a learning program (learning unit) 43*f*. The learning program 43*f* is stored in the storage unit 43 or the like.

The control device 40 optimizes the cooling method information 43*d* by using learning information. For example, the learning information is the vibrations of the machine tool measured by a vibration measurement device provided in the machine tool or the vibrations of the machine tool estimated on the basis of drive currents for the respective motors 3*b*, 13, and 23 in the machine tool. The control device 40 performs learning about the relationship between the learning information and the operating states of the first cooling means and the second cooling means.

The learning information may also be the quality (machining quality) of the workpiece W obtained after machining. The machining quality is obtained by inputting a result visually determined by a user to the control device 40 or the like. The control device 40 may also determine the machining quality of the workpiece W on the basis of an image acquired by using a predetermined camera. The learning information may also be information of the temperature of the drive part. The information of the temperature may be the temperatures of the respective motors 3*b*, 5*a*, 13, and 23 estimated on the basis of the drive currents. The control device 40 may perform learning about the relationship between one or more learning information items and the operating states of the first cooling means and the second cooling means.

As a result of the learning, the control device 40 divides the speed of the spindle and the machining load score, which are included in the cooling method information 43*d* shown in FIG. 7, for example, into more stages, and sets the cooling means for each of the stages. By using the cooling method information 43*d*, which is the result of the learning, proper cooling of the drive part and an improvement of the machining quality are both achieved at a higher level.

Figure 10:
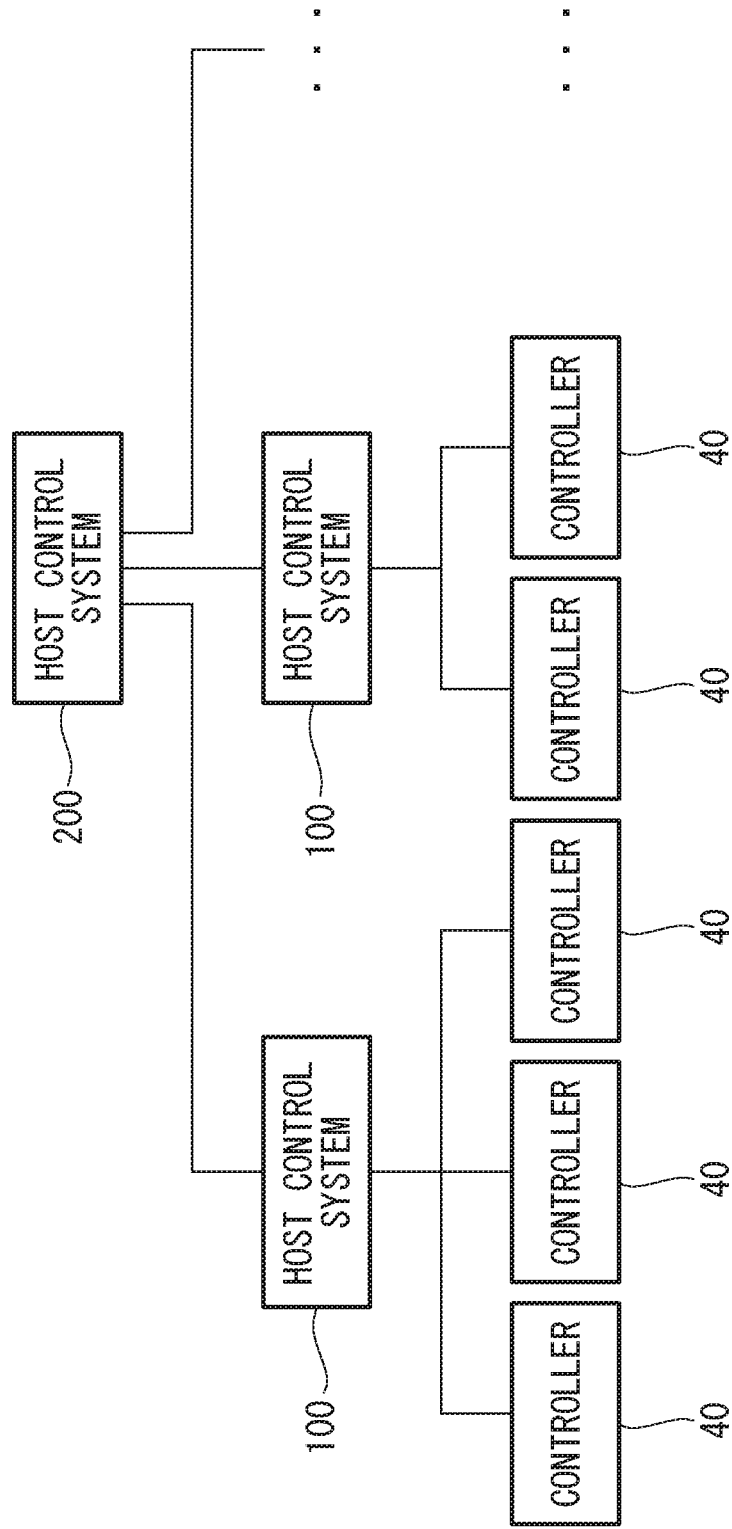
FIG. 10 is a block diagram of a management system that includes the machine tool of this embodiment.
Figure 11:
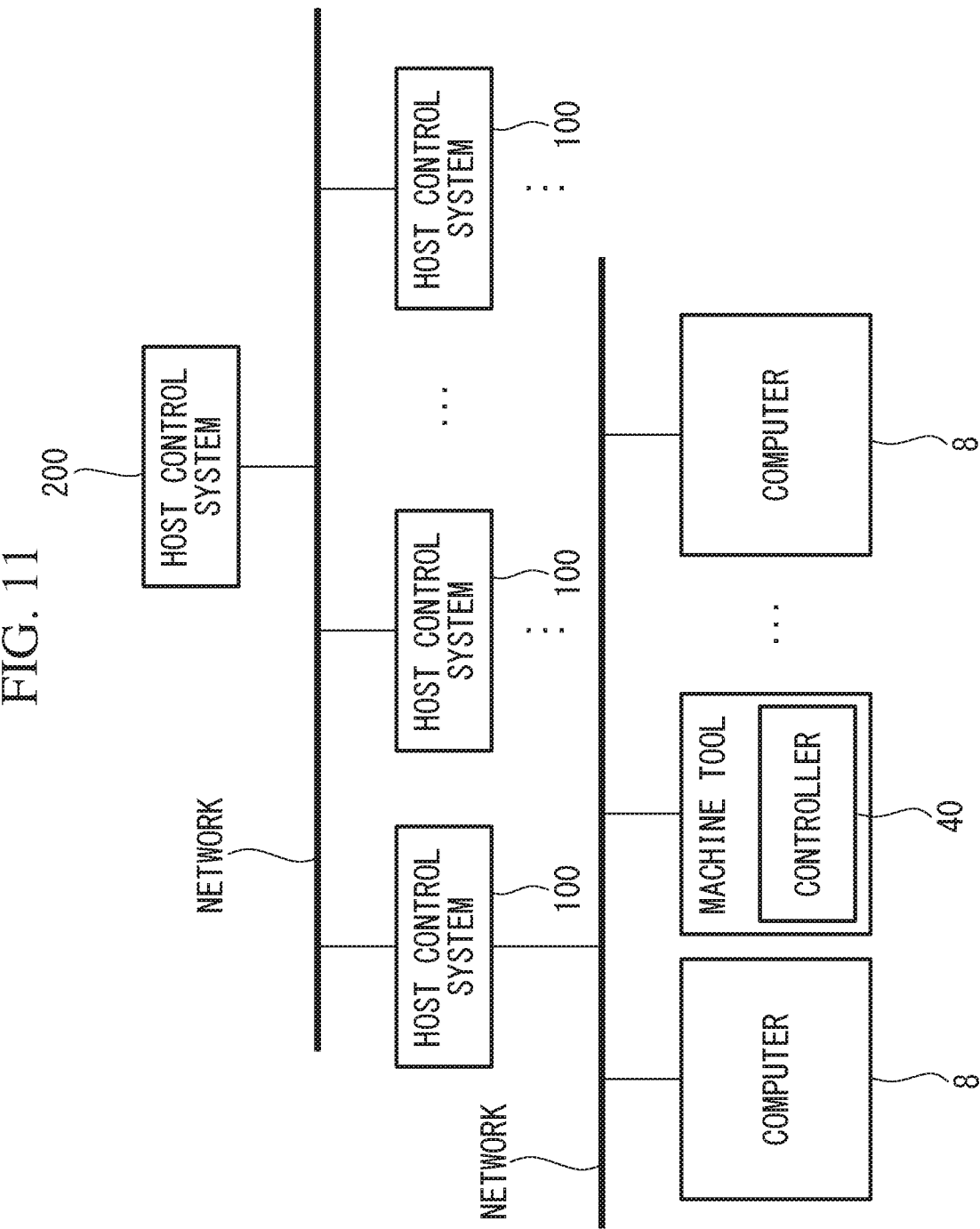
FIG. 11 is a block diagram of a system that includes the machine tool of this embodiment.

As shown in FIG. 10, a plurality of control devices 40 may be connected to a host control system 100. Furthermore, as shown in FIG. 11, computers 8 that each store a simulation program for creating the machining program 43*b* may also be similarly connected to the host control system 100.

The host control system 100 is, for example, a computer that is connected to the plurality of control devices 40 and the plurality of computers 8 by wire or a computer that is disposed at the same site as the plurality of control devices 40 or the plurality of computers 8. The host control system 100 may also be called a fog computer. The host control system 100 can be a production management system, a shipment management system, a machine-tool management system, or a department management system.

A plurality of host control systems 100 may also be connected to another host control system 200 or the like. The host control system 200 is, for example, a cloud server that is connected to the plurality of host control systems 100 in a wired or wireless manner. The plurality of control devices 40 or the plurality of computers 8 and the host control systems 100 and 200 form, for example, a management system.

The host control system 100 and the host control system 200 each include: a control unit that has a processor; a display device; a storage unit that has a non-volatile storage, a ROM and/or a RAM; and an input device, such as a keyboard, a touch panel, or an operation panel.

As shown in FIG. 11, for example, such a system may include a plurality of computers 8 that are edge computers, a plurality of host control systems 100, and one or more host control systems 200. In the system of FIG. 11, the computers 8 and the control devices 40 can be edge computers. Some of the computers 8 and the control devices 40 may be the host control systems 100. The system shown in FIG. 11 includes a wired or wireless network.

Figure 12:
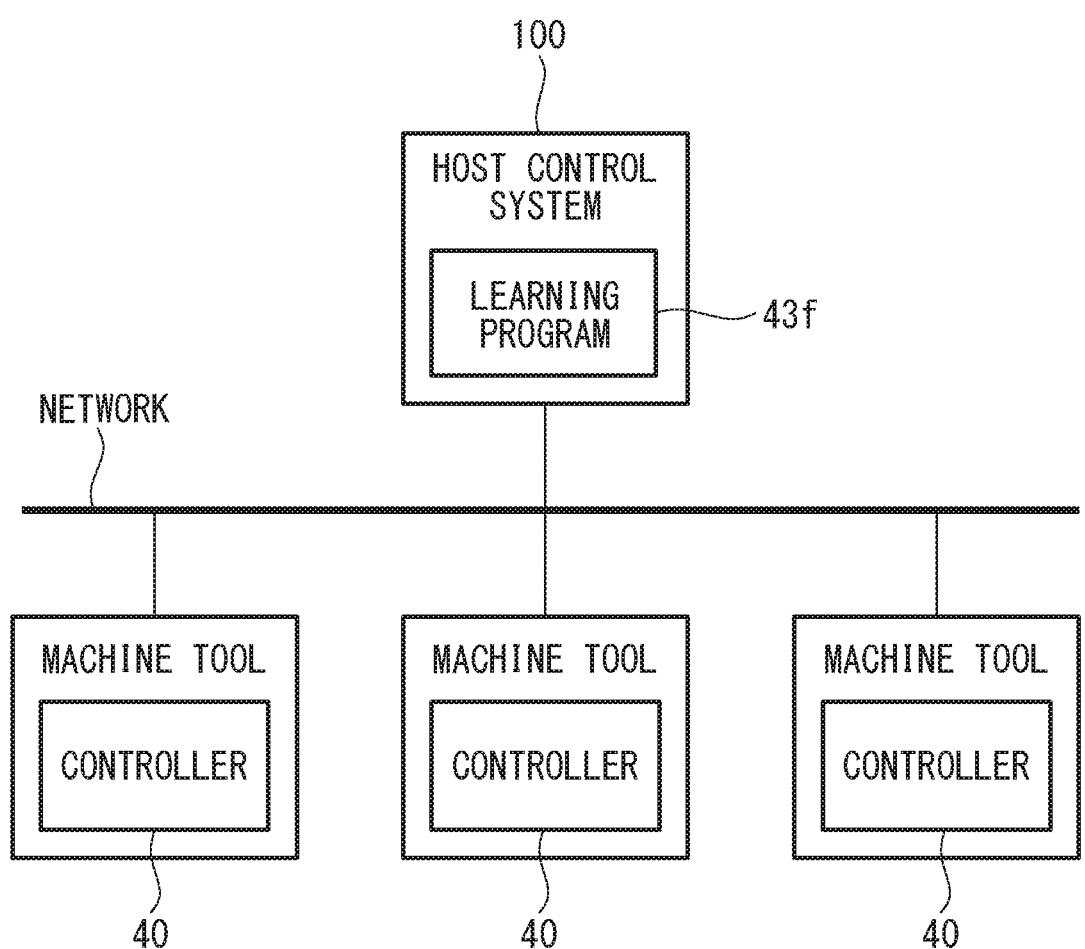
FIG. 12 is a block diagram of a system that includes the machine tool of this embodiment.

It is also possible that the control device 40 sends the aforementioned learning information to another edge computer, another host control system 100, or another host control system 200 that has the learning function. For example, such transmission is performed in a configuration shown in FIG. 12. In this case, the other edge computer, the other host control system 100, or the other host control system 200, which has the learning function, performs learning by using the received learning information, and the cooling method information 43d is optimized in each edge computer.

Furthermore, the other edge computer, the other host control system 100, or the other host control system 200, which has the learning function, can obtain, by using the received learning information, the cooling method information 43d that is commonly used for machine tools respectively controlled by the plurality of control devices 40. Specifically, the plurality of machine tools have the common cooling method information 43d. According to this system, it is possible to improve the speed and/or the reliability of the learning by using various data sets.

Furthermore, a plurality of edge computers and a plurality of host control systems 100 that have the learning function may send at least one of the learning information, a learning model that is created through learning, and a learning result to another edge computer, another host control system 100, or another host control system 200 that has the learning function. For example, such transmission is performed in a configuration shown in FIG. 13. The other edge computer, the other host control system 100, or the other host control system 200, which has the learning function, performs processing for optimizing knowledge and increasing efficiency on the basis of the received information, thereby creating a new optimized or efficient learning model or learning result. The created learning model or learning result is distributed to the control devices 40 of the machine tools. In a case in which the learning result is distributed, it is not necessary for the control devices 40, which serve as distribution destinations, to have a learning function.

The learning information, the learning model, and the learning result can be shared among the plurality of control devices 40. For example, such sharing is performed in the configuration shown in FIG. 13. This leads to an increase in the efficiency of machine learning. Furthermore, it is also possible to implement the learning function in some of the plurality of control devices 40, which are connected to each other by the network, and to use learning results from these control devices 40, when the other control devices 40 control the machine tools. This leads to a reduction in the cost required for the machine learning.

An example case according to the above-described embodiment will be described below.

For example, as described above, the control devices 40 perform learning about the cooling method information 43d, which is used for machining using the tools T. Furthermore, the host control systems 100 and 200 receive, from the control devices 40, learning results and the machining programs 43b, which are related to the learning, and accumulate the received learning results in association with the machining programs 43b.

The host control systems 100 and 200 perform learning by using the accumulated learning results and send the results of the learning to the control devices 40.

Furthermore, the host control systems 100 and 200 send the received learning results or the results of learning performed in the host control systems 100 and 200 by using the received learning results, to the control device 40 that does not have the learning function.

The invention claimed is:

1. A machine tool comprising:
a first cooling unit that cools at least one of a drive part that drives a component of the machine tool and an amplifier of the drive part;
a second cooling unit that cools the at least one of the drive part and the amplifier; and
a control unit that controls the first cooling unit and the second cooling unit,
wherein vibration caused by the second cooling unit is less than vibration caused by the first cooling unit, and
the control unit switches cooling of the at least one of the drive part and the amplifier, from cooling by the first cooling unit to cooling by the second cooling unit,
wherein the control unit is configured to control the drive part based on a machining program,
wherein the control unit switches from the cooling by the first cooling unit to the cooling by the second cooling unit, in response to a control command output from the control unit in accordance with the machining program to the drive part.

2. A machine tool comprising:
a first cooling unit that cools at least one of a drive part that drives a component of the machine tool and an amplifier of the drive part;
a second cooling unit that cools the at least one of the drive part and the amplifier; and
a control unit that controls the first cooling unit and the second cooling unit,
wherein vibration caused by the second cooling unit is less than vibration caused by the first cooling unit, and
the control unit switches cooling of the at least one of the drive part and the amplifier, from cooling by the first cooling unit to cooling by the second cooling unit,
wherein a storage unit of the control unit stores cooling method information,
wherein the cooling method information indicates, in connection with each type of multiple types of tools used for machining, whether to use the first cooling unit or the second cooling unit; and
the control unit switches from the cooling by the first cooling unit to the cooling by the second cooling unit, by using information of an in-use tool among the multiple types of the tools, and the cooling method information.

3. A machine tool comprising:
a first cooling unit that cools at least one of a drive part that drives a component of the machine tool and an amplifier of the drive part;

a second cooling unit that cools the at least one of the drive part and the amplifier; and a control unit that controls the first cooling unit and the second cooling unit, wherein vibration caused by the second cooling unit is less than vibration caused by the first cooling unit, and the control unit switches cooling of the at least one of the drive part and the amplifier, from cooling by the first cooling unit to cooling by the second cooling unit, wherein the machine tool, further comprises:

a spindle to which a tool used for machining is attached, wherein the control unit switches from the cooling by the first cooling unit to the cooling by the second cooling unit, in response to control of the speed of the spindle.

4. A machine tool comprising:

a first cooling unit that cools at least one of a drive part that drives a component of the machine tool and an amplifier of the drive part;

a second cooling unit that cools the at least one of the drive part and the amplifier; and a control unit that controls the first cooling unit and the second cooling unit, wherein vibration caused by the second cooling unit is less than vibration caused by the first cooling unit, and the control unit switches cooling of the at least one of the drive part and the amplifier, from cooling by the first cooling unit to cooling by the second cooling unit, wherein the control unit is configured to control the drive part based on a machining program, wherein the control unit switches from the cooling by the first cooling unit to the cooling by the second cooling unit, in response to information regarding a target machining quality.

5. A machine tool comprising:

a first cooling unit that cools at least one of a drive part that drives a component of the machine tool and an amplifier of the drive part;

a second cooling unit that cools the at least one of the drive part and the amplifier; and a control unit that controls the first cooling unit and the second cooling unit, wherein vibration caused by the second cooling unit is less than vibration caused by the first cooling unit, and the control unit switches cooling of the at least one of the drive part and the amplifier, from cooling by the first cooling unit to cooling by the second cooling unit, wherein the control unit comprises a learning function unit for optimizing switching of the cooling.

6. A system comprising:

a machine tool according to claim 1; and a host computer capable of communicating with the control unit of the machine tool, wherein the host computer accumulates learning results received from the control unit, wherein the host computer is configured to send, to another machine tool that does not have a learning function unit, the learning results or a result of learning performed in the host computer by using the learning results.

* * * * *